March 15, 1960     J. E. HARVEY     2,928,325
PHOTOFLASH SWITCHING
Filed June 25, 1953     3 Sheets-Sheet 2
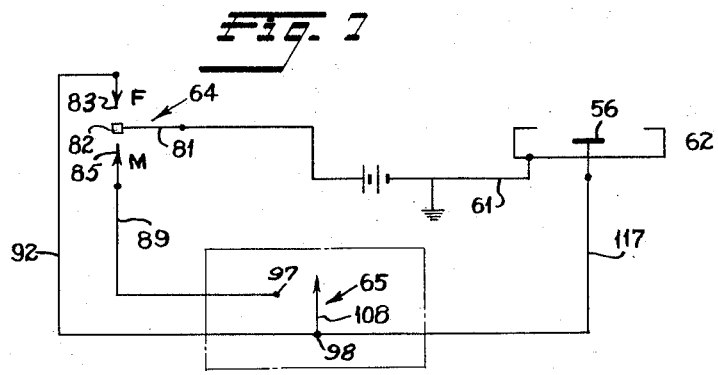
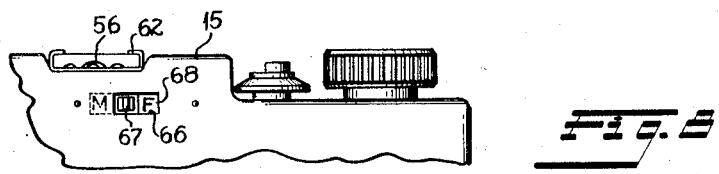
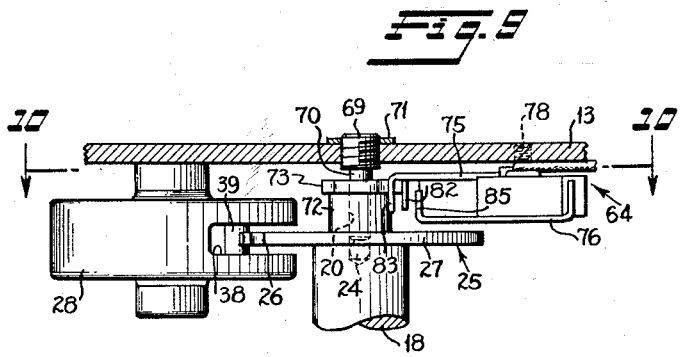
INVENTOR
JAMES E. HARVEY
BY *Strauch, Nolan & Diggins*
ATTORNEYS March 15, 1960   J. E. HARVEY   2,928,325
PHOTOFLASH SWITCHING
Filed June 25, 1953   3 Sheets-Sheet 3
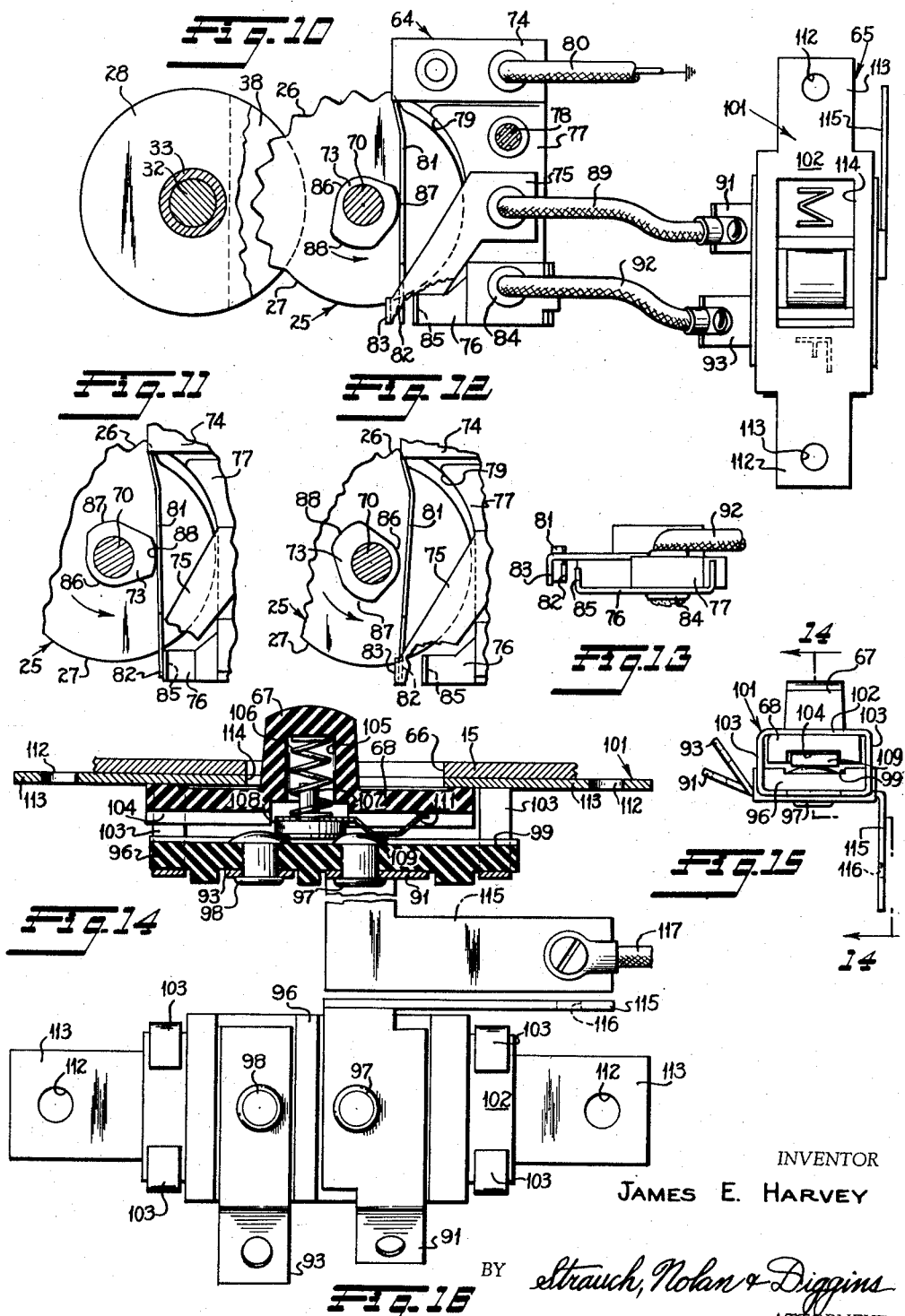
INVENTOR
JAMES E. HARVEY
BY Strauch, Nolan & Diggins
ATTORNEYS

United States Patent Office 2,928,325
Patented Mar. 15, 1960

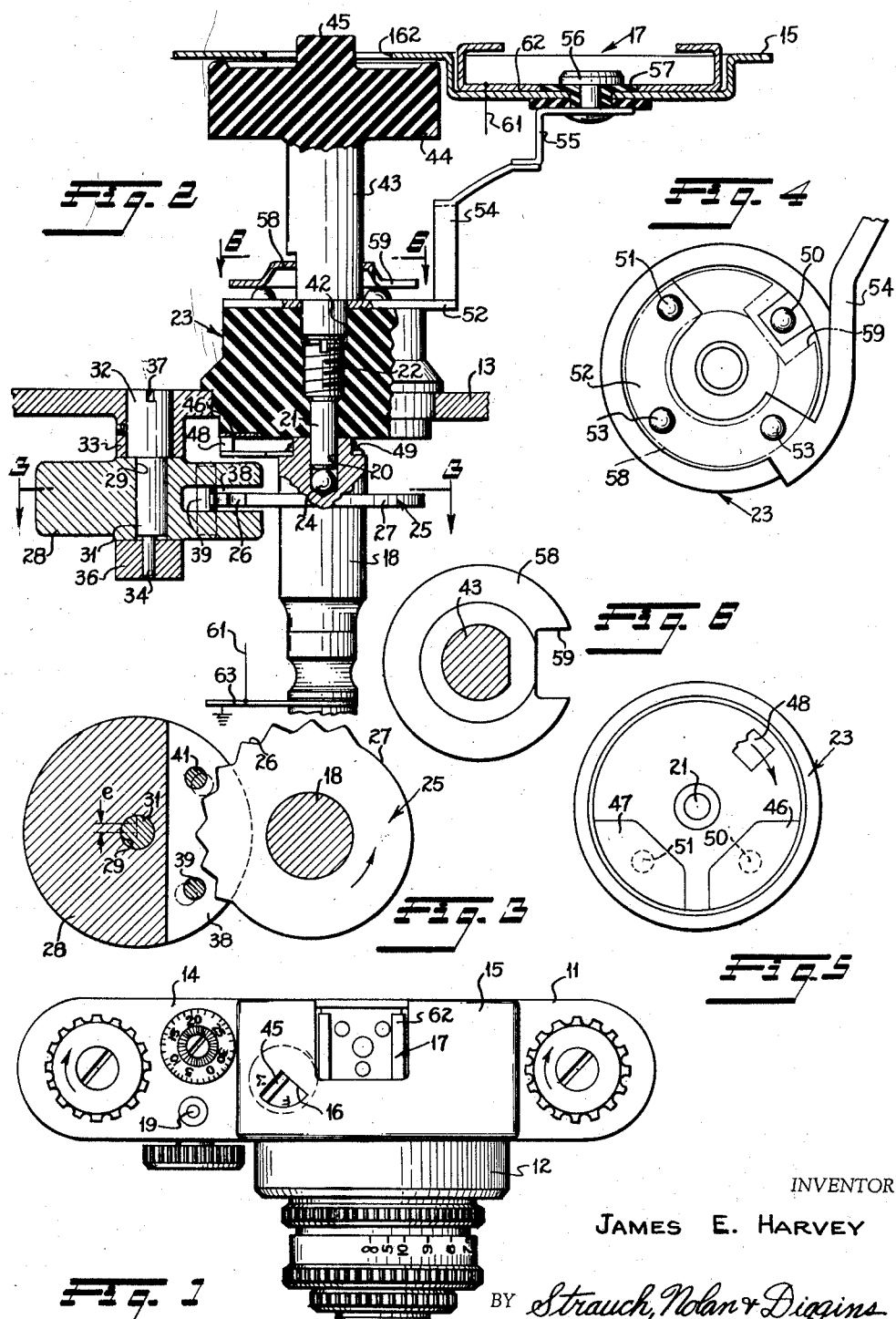

2,928,325

PHOTOFLASH SWITCHING

James E. Harvey, Rochester, N.Y., assignor, by mesne assignments, to Sylvania Electric Products Inc., Wilmington, Del., a corporation of Delaware Application June 25, 1953, Serial No. 364,047

4 Claims. (Cl. 95—11.5)

This invention relates to photography and particularly to flashlight and shutter synchronizing arrangements in cameras.

This is a continuation-in-part of my co-pending application Serial No. 21,284 filed April 15, 1948, now United States Letters Patent No. 2,655,847, issued October 20, 1953.

It is the major object of the invention to provide a novel synchronized flashlight switching and shutter control mechanism.

A further object of the invention is to provide a novel camera construction wherein a power shaft positively accomplishes opening and closing movement of the shutter and actuates a flashlight control switch in synchronism.

A further object of the invention is to provide a novel camera construction having a power shaft for driving a shutter and operating an adjustable photoflash lamp control switch in timed relation.

A further object of the invention is to provide in a camera a novel adjustable photoflash bulb switch arrangement wherein synchronism of the shutter with two different types of flash bulbs may be selected.

It is a further object of the invention to provide a flash bulb switch actuator wherein a shaft driving a rotating contact of the switch is novelly associated with the shutter controls in a camera.

Further objects of the invention will presently appear as the description proceeds in connection with the appended claims and the annexed drawings wherein:

Figure 1 is a top plan view of a camera containing a preferred embodiment of the invention;

Figure 2 is an enlarged elevation partly in section illustrating the upper end of the power shaft and an associated switching mechanism according to a preferred embodiment of the invention;

Figure 3 is a section substantially along line 3—3 of Figure 2 illustrating the inertia wheel and its adjustable mount;

Figure 4 is a top plan view of the synchronizer bearing assembly with the shiftable switch contact shown in phantom lines;

Figure 5 is a bottom plan view of the synchronizer bearing assembly with the brush on the power shaft illustrated diagrammatically;

Figure 6 is a section substantially on line 6—6 in Figure 2 illustrating a top plan view of the contact member on the synchronizer shaft;

Figure 7 is a diagrammatic representation of the flashlight control circuit;

Figure 8 is a fragmentary elevation of the back of a camera wherein a switch according to a further embodiment of the invention is mounted;

Figure 9 is a fragmentary elevation partly in section illustrating the switch of the further embodiment;

Figure 10 is a section on line 10—10 of Figure 9 illustrating the switch operator and connections of the embodiment of Figures 8 and 9;

Figures 11 and 12 illustrate successive operational positions of the switch operator of Figure 10;

Figure 13 is an end elevation of Figure 10 illustrating the arrangement of contacts;

Figure 14 is a section on line 14—14 through the switch adjustment assembly of Figure 15;

Figure 15 is an end elevation of the switch adjustment assembly of Figure 14; and Figure 16 is a bottom plan view of the switch adjustment assembly of Figure 14.

Referring to the embodiment of Figures 1–6, the camera has a body 11 with lens assembly 12 on its front wall. The top body wall 13 of the camera is shown in Figure 2, and it carries a stamped metal shell or cover 14 that encloses the view finder and some of the control mechanism mounted above wall 13. The central raised part 15 of the cover 14 which extends over the view finder has a sector shaped aperture 16 for projection and limiting movement of a switch operating lug to be described, and carries a flash unit socket 17 also later to be described in detail.

Within the camera body is a power shaft 18 which is rotatably driven about its axis from a spring that is energized each time the film is advanced and is released and controlled by an escapement to operate the shutter behind the lens assembly when the shutter control button 19 is actuated. Structure for holding shaft 18 stationary until the film has been advanced and the spring energized after each exposure and for rotating shaft 18 a single revolution each time the shutter release is operated, and the associated shutter and shutter speed controls, are all disclosed and claimed in said Letters Patent No. 2,655,847 to which attention is directed for further detail. The present invention is concerned with actuation of the photoflash switch by shaft 18.

At its lower end, shaft 18 is suitably journaled as disclosed in said Letters Patent No. 2,655,847. At its upper end, shaft 18 is formed with a central bearing recess 20 for seating a radial bearing pivot pin 21 comprising a lower end of a bearing adjustment screw 22 threaded within a bushing assembly 23 fixed in a suitable aperture in wall 13. A thrust bearing comprising a ball 24 in a suitable socket is provided in the inner end of recess 20 in contact with the end of pin 21. Bushing 23 contains part of the switching mechanism for the photoflash bulb circuit. Bushing 23 may be removed as a unit from wall 13, or access may be had at its top to adjust the vertical position of pivot pin 21 and for adjusting or removing bearing pin screw 22.

An annular formation 25 on the upper end of shaft 18 is formed with a sector of peripheral teeth 26 that project beyond the circular surface 27 which is of less diameter than the periphery of the teeth 26. An inertia wheel 28, which comprises a relatively heavy member of metal or some suitable material, is formed with a central bore 29 by which it is freely journaled on a cylindrical pivot 31 that is parallel to shaft 18 and comprises the intermediate portion of a pin having an enlarged head 32 journaled in a suitable wall boss 33. The pin has a smaller tip 34 coaxial with head 32 journaled in a suitable integral wall boss 36.

The head of this pivot pin is slotted at 37, and the axis of cylindrical portion 31 is eccentric with respect to the common bearing axis of the head and tip portions 32 and 34 whereby, when a tool such as a screw driver is inserted into slot 37 and rotated, the inertia wheel by reason of the eccentricity of its journal at 29 will be shifted toward or away from shaft 18. Figure 3 illustrates the relative eccentricity of the pivot pin and its location relative to the inertia wheel axis, the pin in Figure 3 being 90° displaced for illustration.

At the side adjacent shaft 18, the inertia wheel is formed with a cut-out sector 38 which is bridged by parallel pins 39 and 41 disposed at equal angles and equal distances on either side of the common plane of the centers of shaft 18 and journal 31.

Figure 3 illustrates the parts in the position they assume normally prior to start of rotation of shaft 18. As shaft 18 rotates counterclockwise during the exposure making operation under spring power, teeth 26 successively engage the pins 39 and 41 whereby the teeth 26 impart a succession of short reverse rocking actions to the inertia wheel which oscillates between the full and dotted line position illustrated for the pins 39 and 41 in Figure 3. This rocking movement of inertia wheel 28 is like the pallet in the usual escapement. Inertia wheel 28 thus acts as a check on the initial speed of rotation of shaft 18 so that shaft 18 does not attain an excessive speed of rotation when its driving spring is released. The checking action of the oscillating inertia wheel thus substantially opposes and slows rotation of shaft 18 during the period shaft 18 operates the photoflash lamp control switch, as will be described below and during opening movement of the camera shutter. By the time that surface 27 of annulus 25 is disposed within sector 38, the shutter is open and no retarding effect is exerted on shaft 18 by wheel 28.

The effect of inertia wheel 28 on shaft 18 can be varied by shifting the adjustable eccentric pivot 31, whereby the time of engagement of the inertia wheel with the toothed annulus can be varied.

Bushing 23, as illustrated in Figure 2, has a cylindrical bore 42 above screw 22, and a short synchronizer shaft 43 of electrically insulating material which is concentric with shaft 18 has its lower end rotatably supported in bore 42. The upper end of shaft 43 is integrally formed as a selector knob 44, from which upstands a finger projection 45 accessible through suitable aperture 16 of top cover 14, the purpose of projection 45 being for permitting the operator to selectively set the below described switch assembly to cooperate with either fast or slow flash bulbs.

Referring to Figure 5, which illustrates the bottom of the bushing 23, the normally flat surface there illustrated contains imbedded therein two spaced sector-shaped plates of metal 46 and 47 comprising spaced terminals adapted to be wiped across in succession by the brush terminal 48 secured non-rotatably upon the top of shaft 18 as illustrated at 49 in Figure 2. Rivets 50 and 51 extend respectively from plates 46 and 47 longitudinally through bushing 23 and their heads provide spaced contact terminals at the upper side of bushing 23. Opposite these contact terminals is a sector-shaped metal terminal strip 52 which is spaced from rivet 50 but electrically connected to rivet head 51 and further riveted to bushing 23 as at 53. Strip 52 is provided with an integral radially outwardly and upstanding spring contact arm 54 for contacting a metal spring blade 55 depending from the central terminal 56 of the flash lamp adaptor socket 17 which is insulated from the camera body as at 57. Contact plate 47 thus is always in circuit with the center terminal 56 of socket 17. When cover 15 is mounted on the camera body, arm 55 is tightly engaged with arm 54 in electrical contact.

Non-rotatably secured to shaft 43 is a metal contact member 58 shown in Figure 6. The position of member 58 is selected by the operator turning selector knob 44. When the contact 58 is in the position illustrated by phantom lines in Figure 4, which corresponds to the "F" position of Figure 1, it engages the head of rivet 51 and terminal 47 of Figure 5 is in circuit with the flash bulb socket 17. The cut out peripheral recess 59 in member 58 prevents electrical contact between rivet 50 and member 58 in that position. When contact 58 is rotated to the 90° displaced "M" position permitted by opening 16, it bridges rivets 50 and 51 and terminal 46 also is connected into the flashlamp socket center terminal circuit.

Shaft 18 is preferably flashed with copper externally to make it a good electrical conductor. A wire 61 (Figure 2) is connected at one end to outer shell 62 of socket 17 and at the other end to a spring arm 63 grounded on the camera metal body and bearing on shaft 18.

In operation, as shaft 18 rotates through a single revolution to operate the shutter (not shown) to make an exposure under the impulse of its driving spring, the brush 48 which is moving in the direction of the arrow in Figure 5 first contacts segment 46, but if the selector switch contact 52 is in the position of Figure 4, which is the case when a small size bulb is in the flashlamp socket, the flashlamp circuit is not yet closed to energize the bulb, and energization of the bulb is delayed until brush 48 contacts segment 47. The relative angular positions of brush 48 and segment 47 with respect to the shutter operating mechanism are here such that by the time the shutter is wide open, the small lamp connected to the socket will have attained maximum energization and illumination. This is the setting for fast flash bulbs and the letter F on the top of knob 44 will appear visible through opening 16 of Figure 1 in this setting.

If the contact member 58 is in the 90° displaced position from Figures 1 and 4, the flashlamp circuit will be completed as soon as brush 48 contacts segment 46. This position corresponds to the use of the larger type bulb which requires more time to get up to full illumination than does the smaller bulb. This is the "M" setting of Figure 1, the angle of difference between segments 46 and 47 representing the difference in the time that it takes for the two bulbs to reach full illumination as correlated with the speed of rotation of shaft 18, in cooperation with inertia wheel 28.

There is thus provided a novel camera operation wherein the power shaft 18 efficiently operates the shutter during opening and closing movements with substantially uniform speed of rotation, and in synchronism therewith operates a photoflash lamp circuit which may be adjusted for timing the shutter exposure with either the large bulbs which require considerable time to reach full illumination or the small bulbs which reach full illumination in a much shorter time, and thereby correlate full illumination period of either of these bulbs with the maximum shutter opening. The usual battery is of course provided in the circuit when the flash unit is mounted in the socket.

The inertia wheel 28 controls rotation of the shaft 18. During the time that toothed sector 26 is passing through the inertia wheel, brush 48 is traversing contact segment 46. The slowed controlled action of the shaft during this period also prevents shutter rebound action as explained in said Letters Patent No. 2,655,847 whereby the shutter is peculiarly efficient for short exposures.

Once this mechanism has been set, all in predetermined angular relation with respect to shaft 18, there is no further adjustment required as to shaft 18. All adjustments for controlling any of the factors of operation of the camera are separate from power shaft 18, which performs the same sequence of operation regardless of the various adjustments for shutter speed and regardless of which position the bulb selector switch is disposed.

Figure 7 illustrates diagrammatically the operative circuit of a further embodiment of the photoflash system. The shutter mechanism operated switch 64 is closed by the shutter actuating mechanism each time that an exposure is made and once during each complete revolution of shaft 18. The selector switch at 65 determines whether the circuit closing is delayed as will be explained.

Figure 8 illustrates the upper right hand corner of this form of the camera as viewed from the rear, the cover 15 being slotted at 66 to provide access and limit stops for the finger projection 67 of a selector knob 68 which when moved to the right in Figure 8 changes the switch from F to M position in Figure 7 and exposes the letter M through slot 66.

Referring to Figure 9, the upper end of shaft 18 is here, as in the earlier embodiment, provided with toothed annular formation 25 coacting with inertia wheel 28 in the same way. The upper end of shaft 18 is journaled at recess 20 on a cylindrical pivot 70 in the end of a screw 69 held by a locknut 71 on wall 13.

Shaft 18 here terminates in a reduced section 72 surrounding recess 20 and an integral cam 73 spaced below and out of contact with wall 13. Secured upon the bottom of wall 13 is the shutter mechanism operated switch 64 comprising three spaced metal strips 74, 75 and 76 mounted on a block 77 of electrically insulating material. Block 77 is secured on wall 13 as by a screw 78, and is cut away at 79 to clear formation 25.

Strip 74 is turned down from the plane of Figure 10 and then comprises a straight spring leaf section 81 that extends along the side of the block but out of contact therewith. Spring leaf 81 is bent so as to be normally biased away from block 77 to the position shown in Figure 12, and it terminates in a downturned tab 82 shown in Figure 13. Strip 74 is connected to ground on the camera body by flexible lead 80.

Strip 75 extends at an angle over the top of and in spaced relation to leaf 81 and terminates in a downturned tab 83 at the same level at tab 82 and with which tab 82 is engaged in the condition of Figure 12.

Referring to Figure 13, strip 76 is secured upon the underside of block 77 by a rivet 84 and extends toward leaf 81 to terminate in an upturned tab 85 that engages tab 82 in the condition of Figure 11.

Cam 73 has three lobes 86, 87 and 88 of different height from the axis. In operation the normal stopped position of shaft 18 before making an exposure is with intermediate height cam lobe 87 engaging the leaf 81 so that tab 82 does not contact either tab 83 or tab 85, as shown in Figure 10. As the shaft 18 rotates through a single counterclockwise revolution to make an exposure, the highest cam lobe 88 engages leaf 81 to close electrical contact of tabs 82 and 85 as shown in Figure 11, and then upon further rotation of the shaft the transient condition of Figure 12 is reached where the lowest cam lobe 86 is entirely free of leaf 81 whereby the spring bias of leaf 81 urges it out to engage tab 82 with tab 83 as shown in Figure 12. Then shaft 18 continues its revolution to come to rest in the initial condition of Figure 10 where lobe 87 holds the spring leaf contact 81 in off-switch position.

Strip 75 is connected by flexible lead 89 to a terminal 91 of the selector switch 65, and rivet 84 and strip 76 are connected by flexible lead 92 to terminal 93 of switch 65.

Switch 65 comprises a block of insulating material 96 upon which terminals 91 and 93 are riveted at 97 and 98 respectively. Interiorly block 96 is longitudinally grooved at 99, within which the rivet heads are disposed. A sheet metal shell 101 has its upper wall 102 spaced from block 96 and is rigidly secured to block 96 by four corner legs 103 that extend down and are bent under block 96.

Knob 68 comprises a flat block of insulating material formed with a longitudinal groove 104 that faces groove 99 and is disposed for longitudinal sliding movement in the space between block 96 and shell wall 102. Referring to Figure 14, the interior of finger projection 67 has a bore 105 containing under compression coiled spring 106 that surrounds the shank 107 of a plunger 108. A leaf spring element 109 is swingably mounted on plunger 108 and its tip 111 is slidably guided in a deepened part of groove 104 as shown in Figure 14. The lower end of spring 106 is fixed to plunger 108, and element 109 is secured against displacement longitudinally of shank 107.

In the assembly the fixed spacing between wall 102 and block 96 insures that springs 106 and 109 are both compressed. When the parts are in the position shown in Figures 10 and 14, wherein the letter M is exposed through cover slot 66, metal plunger 108 bridges rivets 97 and 98. When knob 68 is slid to the right in Figure 14 to its limit F position, plunger 108 will contact only rivet contact 97.

As shown in Figure 14 the entire switch unit 65 is mounted on cover 15 behind slot 66 by means of suitable fastening elements passing through apertures 112 in integral ears 113 projecting oppositely from shell wall 102, and projection 67 extends through both slot 114 in wall 102 and cover slot 66. The sliding travel of knob 68 is limited by the ends of the slots.

An integral ear 115 extends at right angles to terminal strip 91, and it is apertured at 116 for attachment of flexible lead 117 that is connected to center contact 56 of the socket 17. The other socket element 62 is connected to ground on the camera body.

In operation, as shaft 18 rotates through its exposure making revolution with selector switch 65 positioned for its M setting that is used when the larger flash bulbs are in circuit, as soon as cam 73 causes engagement of tabs 82 and 85, since the terminals 91 and 93 are short circuited by plunger 108, the bulb starts to fire right away. When the knob 68 is shifted to the F position corresponding to the smaller bulbs, engagement of the tabs 82 and 85 does not complete the circuit because plunger 108 is now spaced from rivet contact 98 of terminal 93 and there is a consequent delay in firing of the bulb until cam 73 has rotated sufficiently to permit the condition of Figure 12 wherein tabs 82 and 83 are in contact, so that these smaller bulbs are synchronized with the shutter fully open position.

In practice I prefer to employ at 17 the socket disclosed in the application of John W. Barnes Serial No. 60,740 for Extension Cord Set, now United States Letters Patent No. 2,634,309, issued April 7, 1953.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera, a power driven shutter control shaft, a photoflash attachment socket having a terminal, an energizing circuit for said socket having two spaced stationary contacts, means for selectively connecting both or only a predetermined one of said contacts to said terminal, and switching means actuated by said shaft to electrically close the circuit to said contacts in succession at two spaced intervals during each exposure making revolution of said shaft, said intervals corresponding to the full illumination periods of two different sized photoflash lamps with respect to shutter opening.

2. In a camera, a photoflash unit attachment socket having an outer shell and a center contact spaced by electrical insulation, a power driven shutter control shaft that makes a single revolution each time an exposure is made in the camera, and a photoflash selector and control circuit comprising spaced contacts one of which is always electrically connected to the center contact of said socket, a shiftable selector switch element adapted in one position to bridge said spaced contacts and in another position to engage only that one of said spaced contacts which is connected to said center contact of the socket, a switch blade movable through a cycle wherein it electrically connects one and then the other of said spaced contacts in succession into said circuit, and means operated by said shaft actuating said switch blade through its cycle during each revolution of said shaft.

3. In a camera, a photoflash unit attachment socket having a photoflash circuit terminal, a power driven shutter control shaft that makes a single revolution each time an exposure is made in the camera, and a photoflash selector and control circuit comprising spaced contacts one of which is always electrically connected to said terminal, a shiftable selector switch element adapted to move to one position to electrically connect said contacts so that both contacts are simultaneously electrically connected to said terminal and to another position wherein only said one contact is electrically connected to said terminal, a switch element movable through a cycle wherein it electrically connects said individual contacts in predetermined succession into said circuit, and means operated by said shaft actuating said switch element through its cycle during each revolution of said shaft.

4. In a camera having an internal body wall and a space above said wall closed by a top cover, a power driven shutter control shaft within the body, a switching unit comprising a pair of spaced contacts mounted on said wall, a switch blade actuated by said power shaft to engage said contacts in individual succession during each revolution of said shaft, an externally accessible photoflash unit attachment socket on said cover, a circuit electrically connecting said switching unit to said socket through said space comprising a selector switch adapted in one position to short circuit said contacts, and an operating knob for said selector switch having a manual portion projecting through said cover.

References Cited in the file of this patent

UNITED STATES PATENTS

| | | |
|---|---|---|
| 1,959,596 | Patterson | May 22, 1934 |
| 2,277,233 | Kende et al. | Mar. 24, 1942 |
| 2,305,588 | Smeaton | Dec. 22, 1942 |
| 2,474,378 | Simmon et al. | June 28, 1949 |
| 2,514,919 | Willcox | July 11, 1950 |
| 2,517,407 | Nilsen | Aug. 1, 1950 |
| 2,541,895 | Thunberg | Feb. 13, 1951 |
| 2,552,213 | Pribus et al. | May 8, 1951 |

FOREIGN PATENTS

| | | |
|---|---|---|
| 18,557 | Australia | May 31, 1935 |